No. 796,871. PATENTED AUG. 8, 1905.
E. SACHS.
BALL BEARING.
APPLICATION FILED MAR. 3, 1904. RENEWED JULY 12, 1905.

Witnesses:
H. S. Austin
Louis T. Scudder

Inventor
Ernst Sachs
By
Julian C. Dowell
his Attorneys.

UNITED STATES PATENT OFFICE.

ERNST SACHS, OF SCHWEINFURT, GERMANY.

BALL-BEARING.

No. 796,871. Specification of Letters Patent. Patented Aug. 8, 1905.

Application filed March 3, 1904. Renewed July 12, 1905. Serial No. 269,438.

*To all whom it may concern:*

Be it known that I, ERNST SACHS, a subject of the German Emperor, residing at Schweinfurt-on-the-Main, Germany, have invented a certain new and useful Improvement in Ball-Bearings; and I do hereby declare the following to be a full, clear, and exact description of the invention, such as will enable others skilled in the art to which it appertains to make and use the same.

This invention relates to antifriction-bearings in which a series of balls are arranged between confronting annular ball-races. Heretofore in bearings of this character, especially those having the balls held between inner and outer grooved rings, it has been common to provide a lateral notch or opening in one ball-race or openings at the sides of both ball-races designed to be brought opposite each other for the purpose of inserting and removing the balls; but these constructions have generally necessitated the employment of some removable piece or other suitable device for insuring proper retention of the balls in their grooves or ball-races.

Now the object of the present invention is to arrange the opening or openings for introducing the balls in such manner that they cannot fall out either during the run or the standstill, thus dispensing with the need of any additional means for keeping the balls in place. This is accomplished by a passage or passages oblique to the ball-race, through which the balls have to be forced by pressure while one of the rings is turned or both rings turned in opposite directions. Owing to the curvature of the ball-races, the general form of the passage is spiral. The balls when in place cannot drop out through such a passage, since the pressure on the balls is such that they have no tendency to pass out except directly laterally or practically at right angles to the ball-races, and, furthermore, considerable pressure and proper manipulation are necessary in order to force the balls through the passage.

In the accompanying drawings, which form a part of this specification, several embodiments of the invention are illustrated, all of which will be fully described, whereupon the invention will be defined in the annexed claims.

Figure 1:
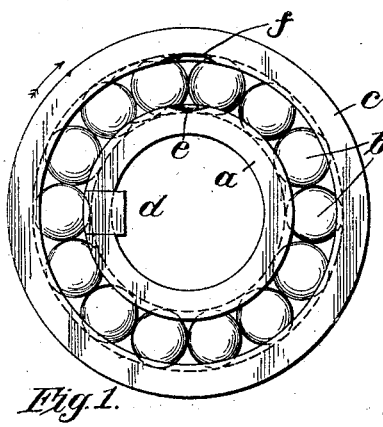
Figure 2:
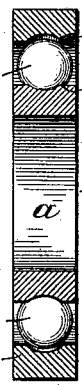
Figure 3:
Figure 4:
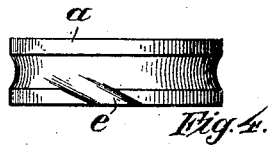
Figure 5:
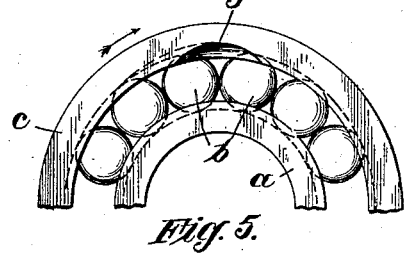
Figure 6:
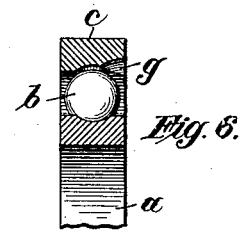
Figure 7:
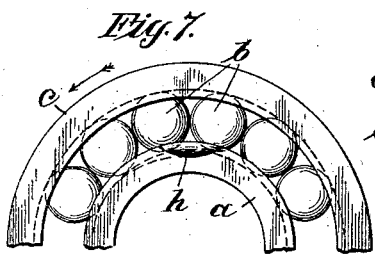
Figure 8:
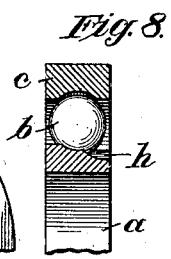
Figure 9:
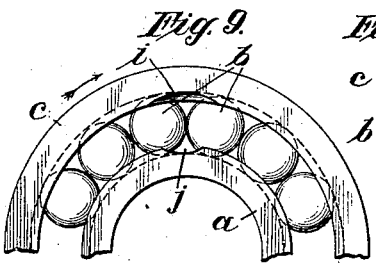
Figure 10:
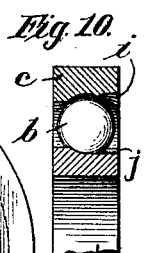
Figure 11:
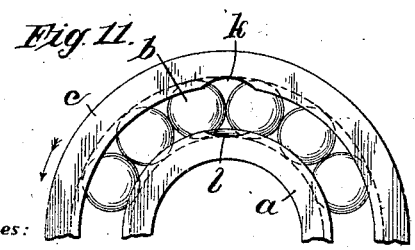
Figure 12:
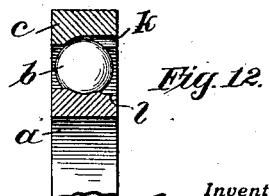

In said drawings, Figure 1 is a front view of a ball-bearing comprising two rings with an interposed series of balls running in confronting annular grooves or ball-races in the rings and having two oblique or spiral grooves or passages for introduction of the balls, one in each ring. Fig. 2 is a central cross-section thereof. Fig. 3 is a cross-section of the outer ring, showing its oblique groove or passage in elevation. Fig. 4 is a view of the inner ring looking down upon the oblique groove or passage. Fig. 5 is a fragmentary front view of a similar ball-bearing having only one oblique passage in the outer ring, and Fig. 6 is a cross-section thereof. Figs. 7 and 8 are corresponding views of a similar ball-bearing having only one passage in the inner ring. Figs. 9 and 10 are corresponding views of a similar ball-bearing having an oblique or spiral passage in the outer ring and an ordinary lateral parti-circular notch or opening in the inner ring. Figs. 11 and 12 are corresponding views of a similar ball-bearing having an oblique or spiral passage in the inner ring and a parti-circular notch or opening in the outer ring.

In each of the views let $a$ indicate the inner ring, $b$ the balls, and $c$ the outer ring. The balls are arranged in confronting annular grooves or ball-races in the inner and outer rings. In a bearing one of the rings is usually fixed, while the other rotates and supports the pressure except when both rings turn either at different speeds or in opposite directions, so that the balls are rendered operative as an antifriction-bearing. In this case the inner ring $a$ is shown having a key $d$ for affixing it to a shaft.

In the first construction (shown in Figs. 1, 2, 3, 4) the balls are introduced by bringing the outer ends or openings of the oblique or spiral passages $e\,f$ opposite each other, then pushing the balls therethrough into their ball-races, while the rings are turned oppositely, or the outer ring in the direction of the arrow or the inner one in the opposite direction. The whole diameter of the opening or channel formed by the passages $e\,f$ is equal to that formed by the ball-races or practically that of the balls. Hence the depths of the passages appear the same as the depths of the ball-races or grooves in which the balls run.

In the second and the third constructions, Fig. 5, 6, and 7, 8, the balls are introduced either by turning the outer ring, as indicated by the arrow, or the inner ring in the opposite direction, while the balls are pushed through the oblique or spiral passage $g$ of Figs. 5, 6, or the passage $h$ of Figs. 7, 8. Inasmuch as the passages $g$ and $h$ are formed only in one ring, such passages are shown having a greater depth than the ball-races.

In the fourth and fifth constructions, Figs. 9, 10, and 11, 12, the balls are introduced in practically the same manner by bringing the outer ends or openings of passages $i\ j$ or passages $k\ l$ opposite each other and pressing upon the balls inserted therein, while the outer ring is turned in the direction of the arrow or the inner ring in the opposite direction. Hence the balls when inserted are moved obliquely to the ball-race in one ring and at right angles to the ball-race in the other ring, since one passage $i$ or $l$ is oblique or spiral, while the other, $j$ or $k$, is directly lateral. Each passage is shown having a depth equal to that of the ball-race into which it leads.

When the balls are in place, it is impossible for them to drop out, for the reasons aforesaid.

I claim as my invention and desire to secure by Letters Patent of the United States—

1. A ball-bearing, in which a series of balls are held in confronting annular ball-races, having a passage for introducing the balls thereto which is oblique to the ball-races.

2. A ball-bearing, in which a series of balls are held in confronting annular ball-races, having a lateral passage for introducing the balls thereto which is oblique to the ball-races.

3. A ball-bearing, in which a series of balls are held in confronting annular ball-races, having a lateral spiral passage for introducing the balls thereto.

4. A ball-bearing, in which a series of balls are held in confronting annular ball-races formed in inner and outer bearing members, at least one of said members having a passage in its bearing-surface which is oblique to its ball-race for introducing the balls in place.

5. A ball-bearing, in which a series of balls are held in confronting annular ball-races formed in inner and outer bearing members, both of said members having oblique passages in their confronting surfaces for introducing the balls when said passages are brought into apposition one confronting the other.

6. A ball-bearing having inner and outer rings with confronting annular ball-races for a series of balls, at least one of said rings having a passage in its confronting surface oblique to its ball-race for introducing the balls between the rings, such passage being of practically a uniform depth and of spiral form in view of the curvature of the ring.

7. A ball-bearing having inner and outer rings with confronting annular ball-races for a series of balls, said rings having in their confronting surfaces passages oblique to the ball-races for introducing the balls between the rings.

8. A ball-bearing comprising a running ring having an annular groove or ball-race for a series of balls, and having a passage in its grooved surface oblique to its ball-race for introducing the balls into place.

In testimony whereof I have signed my name to this specification in the presence of two subscribing witnesses.

ERNST SACHS.

Witnesses:
 EMIL SCHMULZ,
 ERNST ENTEMAN.